United States Patent [19]

Schoos et al.

[11] Patent Number: 5,618,056
[45] Date of Patent: Apr. 8, 1997

[54] METHOD AND INSTALLATION FOR DETECTING CERTAIN PARAMETERS CONCERNING AN AUXILIARY CHILD SEAT WITH A VIEW TO CONTROLLING THE OPERATION OF THE AIRBAGS OF A VEHICLE

[75] Inventors: Aloyse Schoos; Michel Witte, both of Bertrange, Luxembourg

[73] Assignee: I.E.E. International Electronics & Engineering, S.a.r.l., Luxembourg, Germany

[21] Appl. No.: 543,631

[22] Filed: Oct. 16, 1995

[30] Foreign Application Priority Data

Oct. 17, 1994 [LU] Luxembourg ................. 88547
Feb. 15, 1995 [LU] Luxembourg ................. 88588

[51] Int. Cl.$^6$ ................. B60R 21/22; B60R 21/32
[52] U.S. Cl. ................. 280/735; 280/732; 180/273; 340/572; 340/667; 297/250.1
[58] Field of Search ................. 280/735, 734, 280/732, 730.1, 728.1; 180/273, 272; 340/572, 667, 666; 297/250.1, 216.11

[56] References Cited

U.S. PATENT DOCUMENTS

| 3,810,147 | 5/1974 | Lichtblau | 340/572 |
|---|---|---|---|
| 5,103,209 | 4/1992 | Lizzi et al. | 340/572 |
| 5,454,591 | 10/1995 | Mazur et al. | 280/735 |
| 5,468,014 | 11/1995 | Gimbel et al. | 280/735 |
| 5,474,327 | 12/1995 | Schousek | 280/735 |
| 5,515,933 | 5/1996 | Meyer et al. | 280/735 |

FOREIGN PATENT DOCUMENTS

| 0650869A1 | 5/1995 | European Pat. Off. | 280/735 |
|---|---|---|---|
| 4110936A1 | 10/1992 | Germany. | |
| 4237072 | 12/1993 | Germany. | |
| 4410402A1 | 9/1994 | Germany | 280/735 |
| 4426677A1 | 2/1995 | Germany | 280/735 |
| WO94/22693 | 10/1994 | WIPO | 280/735 |

OTHER PUBLICATIONS

Search Report European Patent Application No. 95115594.4, Feb. 1996.
Research Disclosure No. 35519, Disclosed Anonymously, Nov. 1993.
Research Disclosure No. 35804, Disclosed Anonymously, Feb. 1994.
Research Disclosure No. 35909, Disclosed by Jon P. Kelley, Mar. 1994.

*Primary Examiner*—Brian L. Johnson
*Assistant Examiner*—Peter C. English
*Attorney, Agent, or Firm*—Leydig, Voit & Mayer, Ltd.

[57] ABSTRACT

A system to detect certain parameters concerning an auxiliary child seat placed on a passenger seat of a motor vehicle equipped with an airbag protection system. The system uses inductive electromagnetic emitter and receiver circuits located in the passenger seat and at least two resonant circuits provided in the base of an auxiliary child seat. Using the inductive and resonant circuits, the system detects various parameters concerning the child seat. Some of the parameters include the presence of a child seat, whether or not the child seat is occupied, the orientation of the child seat, and the type of child seat present. These parameters are transmitted to an airbag control unit in order to adapt the deployment of the airbag to the specific circumstances as indicated by the inductive and resonant circuits. The transmitted information allows the airbag control unit to disable the airbag in certain situations where it is not needed, such as when the child seat is not occupied or is facing the rear of the vehicle.

16 Claims, 4 Drawing Sheets

METHOD AND INSTALLATION FOR DETECTING CERTAIN PARAMETERS CONCERNING AN AUXILIARY CHILD SEAT WITH A VIEW TO CONTROLLING THE OPERATION OF THE AIRBAGS OF A VEHICLE

FIELD OF THE INVENTION

The present invention relates to a method for detecting certain parameters concerning an auxiliary child seat placed on a passenger seat of a motor vehicle equipped with an airbag protection system, it being possible for these parameters to be used to adapt the deployment of the airbag or airbags associated with the seat supporting the said auxiliary seat to specific circumstances determined by these parameters.

The invention also relates to an installation for the implementation of the invention.

BACKGROUND

The ever-increasing amount of airbag equipment in vehicles has allowed a great deal of information to be gathered concerning the operation of airbags, something which has greatly contributed to improving them. One of these improvements consists in subjecting the operation of the airbag to an intelligent control unit which may be fed by various detectors in order to adapt the deployment of the airbag to certain circumstances.

Thus, for example, document DE-4237072 proposes a system for detecting whether or not the passenger seat is occupied, so as to disable this airbag when this seat is not occupied, in order not to have to replace the airbag when the vehicle is repairable after an impact which has triggered the deployment of the airbag.

Furthermore, novel gas generators are currently under development so as to make it possible, in the future, to have a multi-level operation and a deployment which is modulated and more graduated than all-or-nothing, especially so as to take account of the inertial mass of the passenger, which may be obtained through the information supplied by the seat-occupancy detector, when the latter consists of a pressure sensor of the FSR type.

Moreover, equipping each seat of a vehicle with several individual airbags, the deployments of which are different and adapted to zones to be protected is known.

Although the merit of airbags has meanwhile been recognized in the interest of passenger safety, there are, however, situations in which the deployment of an airbag may be harmful, or even constitute serious danger. There are currently on the market many types of auxiliary child or infant seats which are designed to be installed on the front passenger seat. Of these seats, some are designed to point in the direction of travel of the vehicle, and others in the opposite direction with the back against the glovebox area or the dashboard and some may be installed either way round as desired.

Now, for most seats which point in the opposite direction to the direction of travel of the vehicle, there is the risk that the deployment of the airbag will throw the child together with the seat violently towards the rear of the vehicle and will be the cause of serious injury. In such a case, and for the seats in question, it would therefore be useful to be able to disable the airbag.

It has even been observed that some child seats which point in the direction of travel may also be dangerous in the event of the deployment of the airbag, so that some manufacturers recommend that an airbag be disabled whenever the seat with which it is associated is occupied by an auxiliary child seat.

Moreover, sometimes the child seat remains in place on the seat of the vehicle without actually being occupied. In this case, there is also something to be said for avoiding the deployment of the airbag since, as mentioned earlier, the replacement of an airbag gives rise to quite substantial expenditure.

OBJECTS AND SUMMARY OF INVENTION

The object of the present invention is to provide a method and an installation which make it possible to detect reliably various parameters concerning an auxiliary seat in order, in certain circumstances, to disable the airbag system directly or, and for preference, to transmit signals to an intelligent airbag-control unit which is programmed to control the airbag or adapt its deployment to the circumstances.

In order to achieve this objective, the method according to the invention consists in detecting at least the presence of the said auxiliary seat electromagnetically.

The simplest embodiment allows the airbag or airbags to be disabled each time the presence of an auxiliary seat is detected, regardless as to whether or not it is occupied and irrespective of its orientation.

According to another embodiment, not only the presence but also the occupancy and position of the auxiliary seat are detected, which makes it possible to disable an airbag when the auxiliary seat is unoccupied or when it points in the opposite direction to the direction of travel, and to leave it enabled or modulate the intensity of its deployment when the auxiliary seat is pointing in the direction of travel.

This detection of the position may also be used to inform the driver of incorrect positioning, independently of the orientation.

According to another embodiment, the type of auxiliary seat and/or its identification code are furthermore detected, which makes it possible further to diversify the control of an airbag or the modulation of the deployment to take account of the fact that some seats are safer than others or may be equipped with a special protective device.

The invention also envisages an installation of the implementation of this method comprising at least one emitter circuit and at least one electromagnetic induction receiver circuit, both incorporated into the passenger seat of the vehicle which is protected by an airbag, at least two resonant circuit incorporated into the base of the child seat and intended to modify, when the child seat is placed on the said passenger seat, the electromagnetic coupling between the said emitter circuit and the said receiver circuit so as to allow the receiver circuit to deliver a signal representing one or more given parameter(s) of the child seat.

The installation may include at least one emitter coil fed with alternating current by an oscillator and at least one receiver coil, the emitter and receiver coils being incorporated into the passenger seat.

The emitter and receiver coils may be flat coils printed on a flexible support sheet.

The resonant circuit incorporated into the child seat may be a flat coil associated with an electronic circuit intended to modulate the electromagnetic coupling with a characteristic code or item of information.

The child seat preferably includes two resonant circuits, the associated circuits of which produce different modulations with a view to distinguishing between them and, consequently, to detecting the orientation of the child seat.

Instead of directly controlling the disabling of an airbag on the basis of the data picked up, it is preferable to transmit the data relating to various parameters of the child seat to an intelligent control unit to which airbag equipment is increasingly subjected. This unit then exerts control over the operation of the airbag on the basis of the information received.

The emitter and receiver circuits may thus each consist of at least one elongate inductive structure extending over one lateral side of the seat, while the resonant circuits include inductive coils situated laterally along both sides in the base of the child seat, the inductive structures in the seat and the coils in the child seat having superficial dimensions which are greater than or comparable with the vertical distance between the said structures and the said coils.

The passenger seat contains, preferably on each side, a pair of emitter and receiver structures. Given that these two inductive structures are found on the sides of the passenger set, that is to say in regions which are subjected to less deformation than the central region of the seat, the detection system is hardly disrupted by the deformations of the seat.

Given that the superficial dimensions of the inductive structures and of the resonant circuit are relatively large, it is possible to facilitate the electromagnetic coupling and the geometric association and reduce the sensitivity to small displacements of the child seat.

The pairs of emitter and receiver structures are preferably combined on a flexible thin film incorporated into the seat, so that the passenger is not put to any discomfort.

The electromagnetic coupling may be modulated by switching the resonant frequency of the circuit incorporated into the child seat. Such a modulation consumes practically no energy.

Since the modulation and the information transmitted are in a known temporal relationship with the excitation generator, it is possible, so as to improve the signal/noise ratio, to use synchronous detection methods. The modulation of the electromagnetic coupling by a synchronous subcarrier frequency serves to render the interpretation of the signal more unique and more reliable.

To reduce the influence of the tolerance of the electronic components and eliminate phase-cancellation phenomena, the excitation frequency may be varied periodically within a band of predetermined frequencies.

Demodulation may be synchronized with the excitation signal and reception may use methods of coincidence with the signal emitted.

The child seat advantageously contains a system for recognizing whether this seat is occupied. Such systems are known per se and are already commonly used to detect whether or not a passenger seat is occupied. In this case, the information transmitted by the modulation of the electromagnetic coupling of the resonant circuit is modified by the child seat occupancy sensor in order to transmit the information relating to the occupancy of the seat to the airbag control unit. This information serves to prevent the deployment of an airbag when the child seat is not occupied, irrespective of its orientation.

To transmit the information relating to the presence, the orientation, the type and, possibly, the occupancy of the child seat, it is possible to modulate the inductive coupling using a pseudo-random binary sequence imposed on the resonant circuit in the child seat by an electronic circuit.

BRIEF DESCRIPTION OF DRAWINGS

Other specific features and characteristics of the invention will emerge from the description of a few preferred embodiments given below by way of illustration with reference to the appended drawings in which.

DETAILED DESCRIPTION OF PREFERRED EMBODIMENTS

Figure 1:
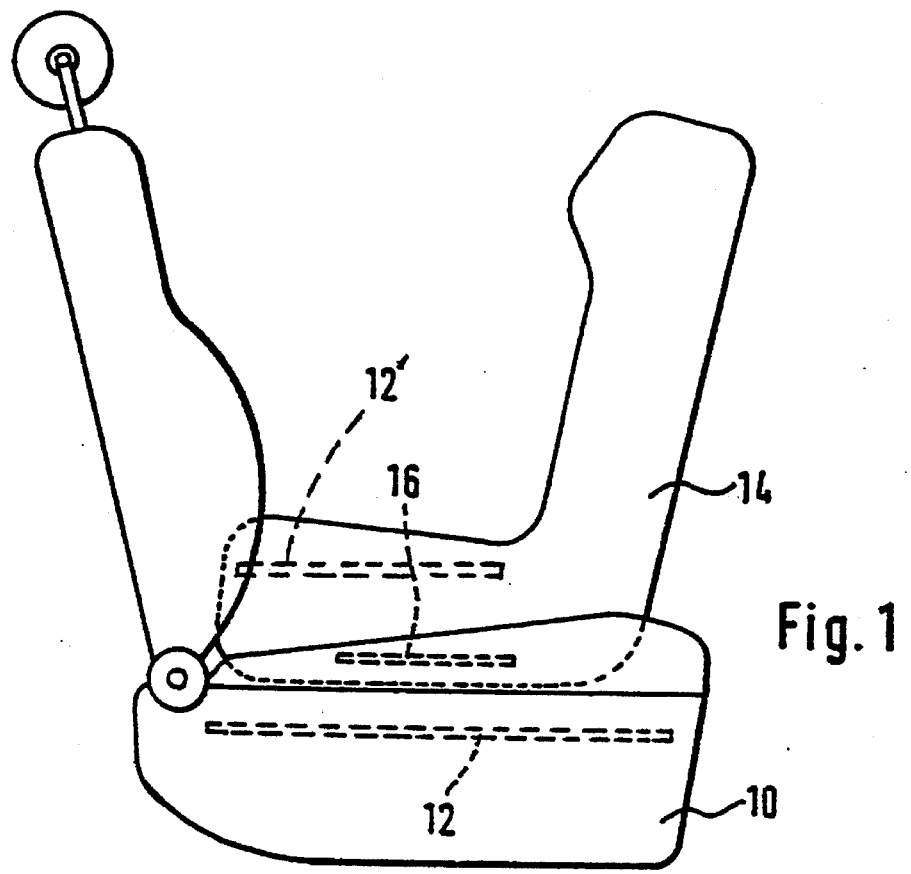
FIG. 1 represents a lateral diagrammatic view of the child seat placed on the passenger seat.

Reference 10 in FIG. 1 diagrammatically illustrates the front passenger seat of a motor vehicle. This seat is equipped with a pressure sensor 12 of the FSR type as proposed in document DE 4237072 for detecting whether or not the seat is occupied and disabling the airbag when this seat is empty. The sensor is in the form of a circuit printed on a flexible support which adapts to the deformations of the seat 10.

The reference 14 diagrammatically denotes a child seat installed on the passenger seat 10. Incorporated into this seat 14 is a support for a resonator 16 which essentially consists of a flat coil which may, for example, be printed on an appropriate support together with a capacitor 20 (see FIG. 3) so as to form a resonant LC circuit. The child seat is also equipped with a child seat occupancy sensor 12' constructed like the sensor 12.

Figure 2:
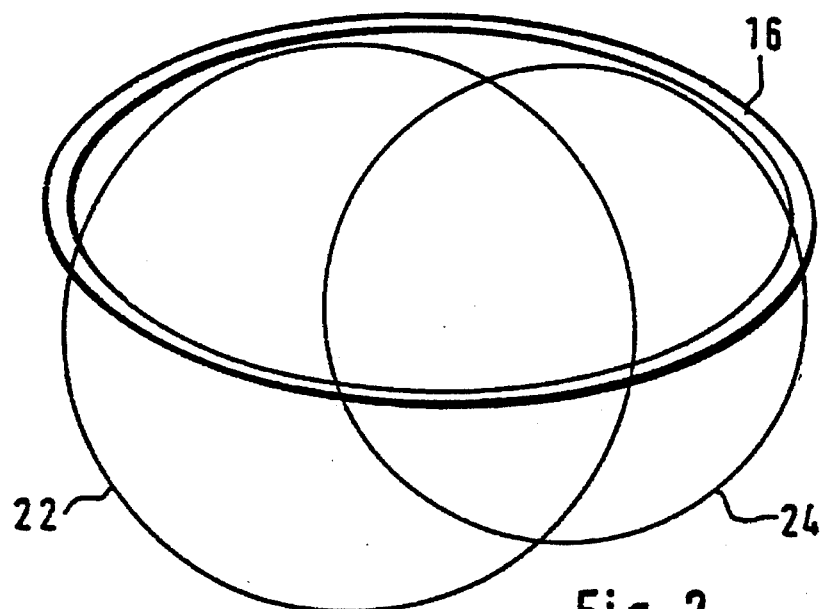
FIG. 2 is a block diagram of the electromagnetic circuits.

On the sensor, in the passenger seat 10, there are two coils 22, 24 (see FIG. 2). These coils 22, 24 do not form part of a resonant circuit and may have a mediocre Q factor, which allows the use of coils produced by very economical means, for example silk-screen printed on the plastic support sheet of the sensor 12.

Figure 4:
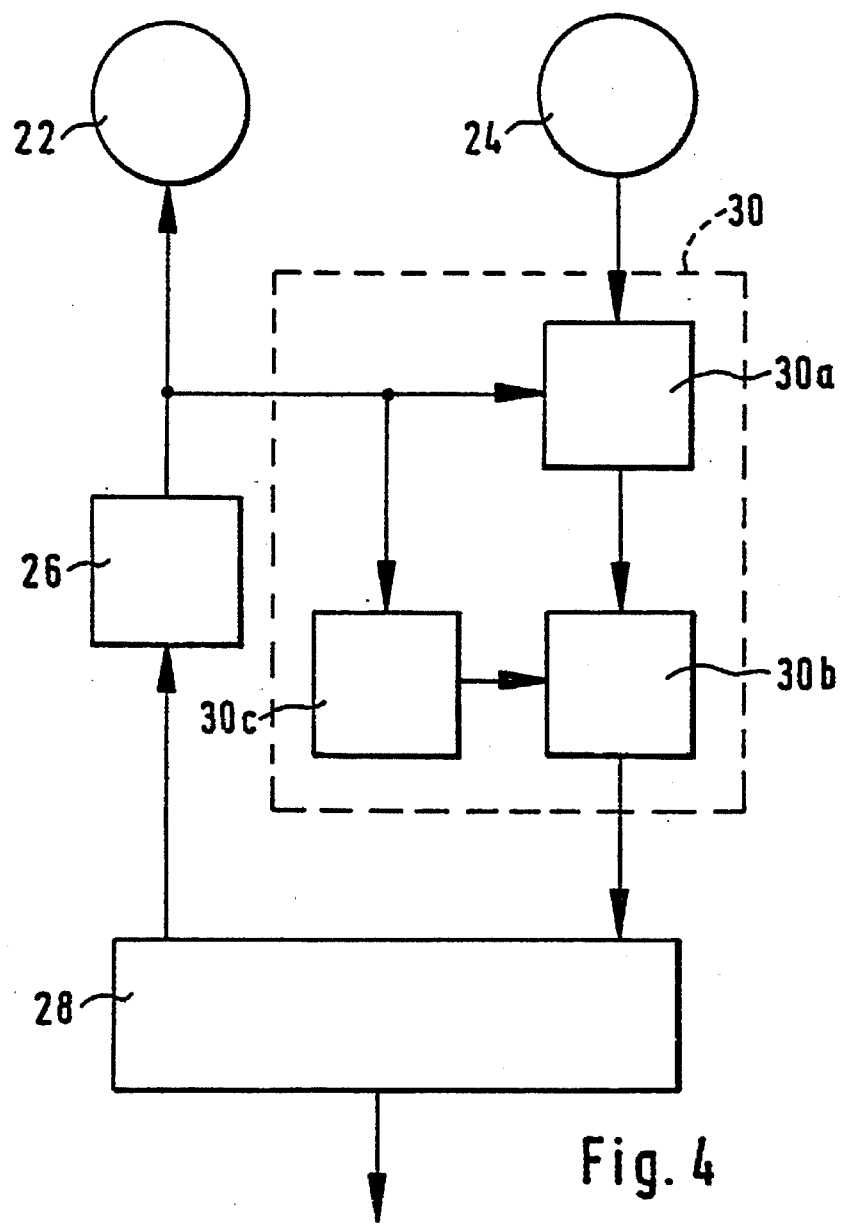
FIG. 4 is a block diagram of the circuits in the passenger seat.

One of the coils, for example the coil 22, is an emitter coil which, as FIG. 4 shows, is fed with alternating current by an oscillator 26 under the control of a microprocessor 28 which may be the standard microprocessor of the pressure sensor 12. The other coil 24, which is a receiver coil, is connected through an amplifying and demodulating circuit 30 to the microprocessor 28 which detects the state of excitation of the receiver coil 24.

If, installed on the seat 10, there is a child seat, in the base part of which is integrated a resonator 16 according to the present invention, and if the coil of this resonator at least partially covers each of the two coils 22 and 24, as represented in FIG. 2, the resonator 16 is in a high state of excitation if the frequency of the oscillator 26 is close to the resonant frequency of the resonator 16. The latter therefore in turn influences the electromagnetic coupling between the emitter coil 22 and the receiver coil 24. This modification in coupling is detected via the circuit 30 and the microprocessor 28 to trigger a signal bound for the airbag-control unit.

In other words, if, in standardized fashion, child seats include a resonator 16 as described above and if this resonator is always provided at a clearly determined location so that it is at least partially superimposed with the coils 22 and 24 in the passenger seat when the child seat faces the direction opposite to the direction of travel of the vehicle and if it is outside the influence of the two coils 22 and 24 when the seat points in the direction of travel of the vehicle, the airbag may be prevented from operating when the child seat faces backwards and may remain enabled when it faces forwards.

Figure 3:
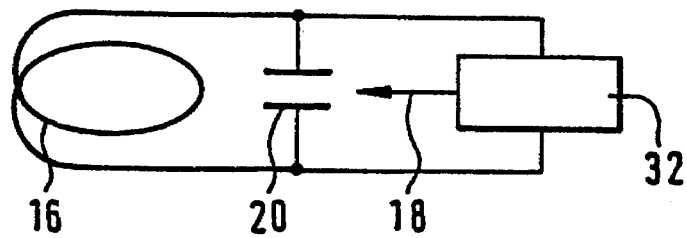
FIG. 3 represents an advantageous alternative form of the resonant circuit in the child seat.

As FIG. 3 shows, each resonant circuit advantageously includes an electronic circuit 32 intended to modulate the electromagnetic coupling as symbolized by the arrow 18 so as to allow better identification of the resonator and of the information to be transmitted. Such a circuit may consist of an integrated circuit operating without any supply of energy other than the voltage induced in the resonator.

To improve the reliability of the interpretation of the results from the detection, the modulation of the electromagnetic coupling at the circuit 32 is advantageously achieved using a subcarrier frequency synchronous with the excitation generator. In this case, demodulation is synchronized with the excitation signal in the circuit 30 of FIG. 4 which in this case will include a synchronous demodulator 30a of the carrier frequency and a synchronous demodulator 30b of the subcarrier frequency as well as a divider 30c on the subcarrier frequency.

The circuit 32 may, as an option, include a system making it possible to preclude the possibility of the operation of the airbag being disabled when it shouldn't be, for example when a passenger is carrying an instrument or apparatus containing a coil capable of receiving excitation from the emitter 22. To guard against this eventuality, which is admittedly quite rare but theoretically possible, of a parasitic resonator being detected instead of the child seat, the circuit 32 serves to modulate the coupling of the resonator 16 with a characteristic code or item of information, for example a binary sequence which is clearly defined and sufficiently long for the probability of picking up this sequence from a parasitic source, that is to say without the existence of this circuit, to be negligible.

In addition to the identification function, the binary sequence generated by the integrated circuit 32 may carry additional information, such as information on the type or model of childseat if the necessary bits are added to the basic codes.

Figure 5:
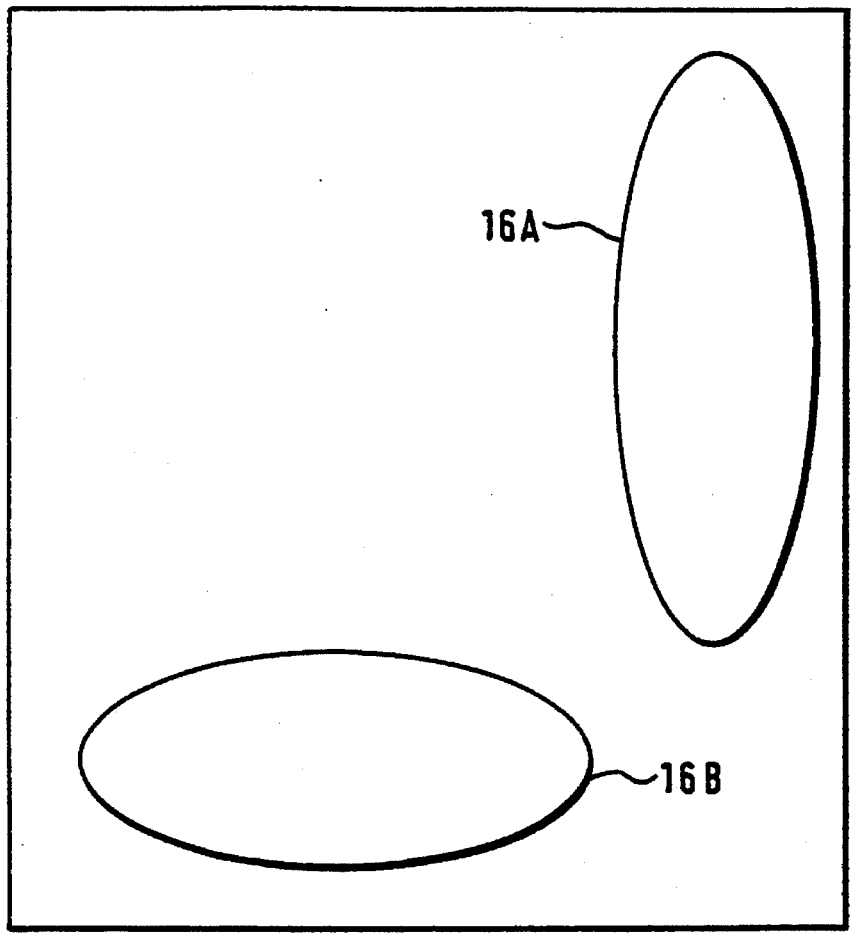
FIG. 5 is an advantageous alternative form of the resonant circuits of the child seat.

FIG. 5 diagrammatically illustrates an alternative form in which two resonators 16A and 16B as described above are incorporated into the base part of the child seat. The circuits 32 associated with these resonators 16A and 16B produce different modulations, for example using different subcarrier frequency, which makes it possible automatically to recognize the orientation of the seat for disabling the airbag only when the seat is facing backwards. It is of course also possible to provide a system with more than two resonators.

Given that the coils in the child seat and on the pressure sensor 12 can be made without substantial expenditure and that control may be provided by the standard microprocessor which is present in any case for the operation of the pressure sensor, the system proposed by the invention is very cheap.

Figure 6:
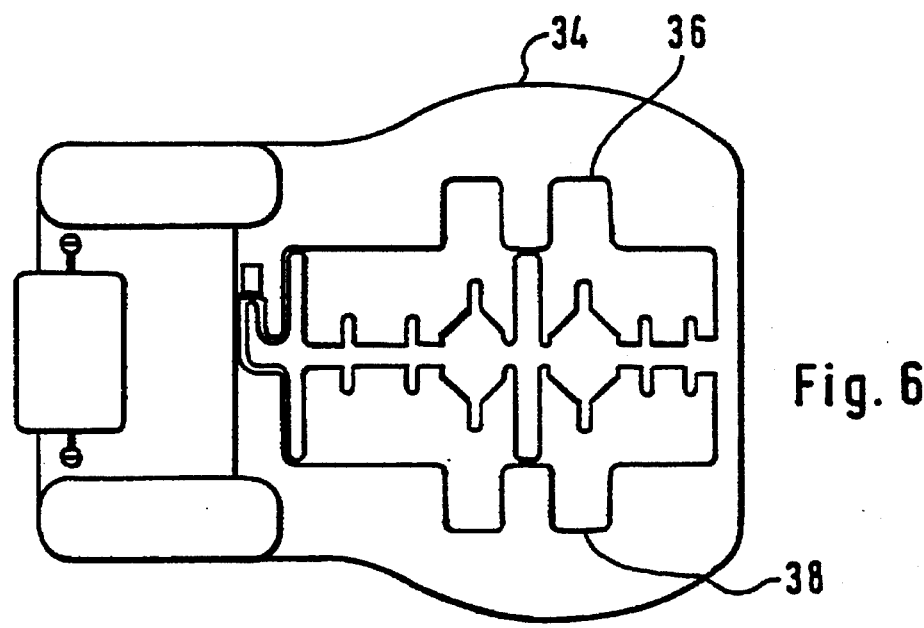
FIG. 6 shows a plan view of a passenger seat with an alternative form of an inductive circuit according to the present invention, FIG. 7 diagrammatically shows a horizontal section through the base of a child seat with a resonant circuit.

FIG. 6 shows a passenger seat 34 with an alternative form of inductive circuits according to the present invention. These circuits are preferably printed onto a flexible thin film which may be incorporated into the upper part of the seat 34 without putting the passenger to any discomfort.

These circuits consist of two elongate structures 36, 38 extending respectively along a lateral side of the seat. Each of the structures includes two inductive loops, one being an emitting antenna and the other a receiving antenna, it being possible for these loops to be superimposed, for example on either side of their support film. In the example represented, these loops have an irregular and complex outline, whose appearance may vary depending on the shape of the seat cushion in which they are incorporated. Although it is preferable to have both structures 36, 38, it should be noted that in principle just one of the structures 36 or 38 may suffice for detection.

Figure 7:
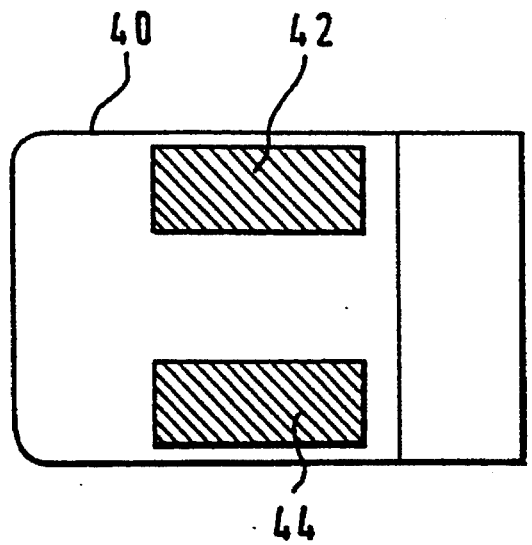

FIG. 7 shows a child seat 40 in the base of which there are resonant circuits on an appropriate support. These circuits include two resonators 42, 44 consisting of large coils extending along the two lateral sides at the base of the seat 40.

Figure 8:
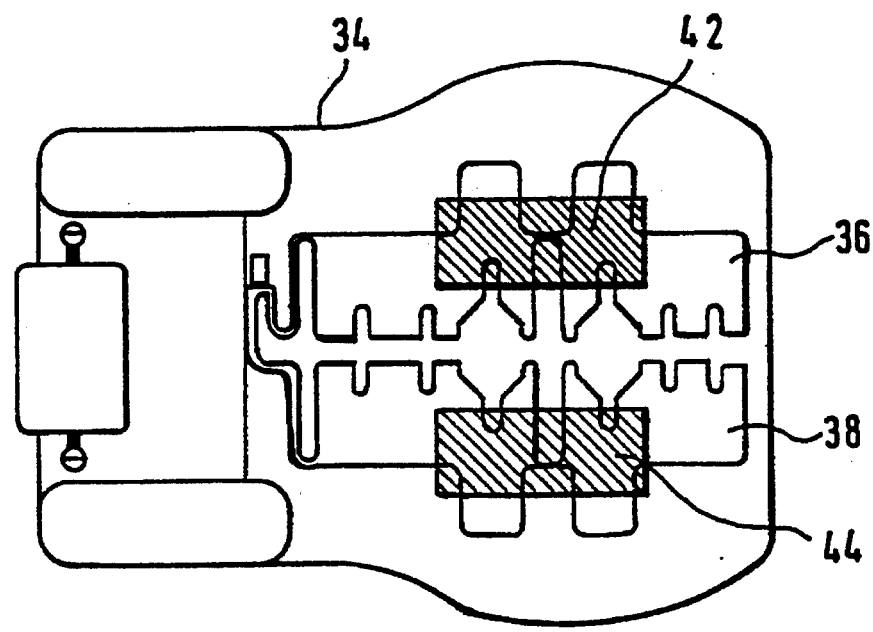
FIG. 8 is a diagrammatic superposition of the inductive and resonant circuits of FIGS. 6 and 7 when the child seat is placed on the passenger seat.

FIG. 8 diagrammatically shows the child seat 40 placed on the passenger seat 34. As can be gathered from FIG. 8, the resonators 42 and 44 are always superimposed with the emitter and receiver antennae of the inductive structures 36, 38 in the passenger seat, even in the event of the child seat 40 sliding with respect to the passenger seat 34.

The inductive and resonant circuits of FIGS. 6–8 operate in the same way as those of the preceding figures and make it possible, as desired, to collect various information regarding the seat 40, especially information relating to the position and orientation of the child seat 40 with respect to the passenger seat 34, the presence of the seat 40, optionally its type and the occupancy of the child seat 40.

Although the invention has been described, by way of illustration, with reference to the protection of an auxiliary seat installed on the front passenger seat of a vehicle, it is obvious that it is equally applicable to the rear passenger seats when these are protected by an airbag system.

Likewise, vehicles in which each seat is equipped with several airbags or whose deployments are modulated by several explosive cartridges may derive great benefit from the information supplied by the present invention so as to adapt the deployment of the airbag or airbags to the specific circumstances.

We claim:

1. A system for detecting certain parameters concerning an auxiliary child seat placed on a passenger seat of a motor vehicle equipped with an airbag protection system so that the parameters are used to adapt the deployment of the airbag protection system associated with the seat supporting said auxiliary seat according to the parameters detected, comprising:

at least one electromagnetic induction emitter circuit and at least one electromagnetic induction receiver circuit, each electromagnetic induction emitter and receiver circuit being incorporated into the passenger seat of the vehicle which is protected by the airbag protection system;

at least two resonant circuits incorporated into the base of the child seat and positioned, when the child seat is placed on the passenger seat, to influence an electromagnetic coupling between each electromagnetic induction emitter and receiver circuit so as to cause each electromagnetic induction receiver circuit to deliver a signal representing at least one of the parameters;

wherein each resonant circuit is associated with electronic modulation circuit means for modulating the electromagnetic coupling with a distinct modulation, the distinct modulation of each resonant circuit providing means for distinguishing between the respective resonant circuits.

2. A system according to claim 1, wherein each resonant circuit incorporated into the child seat includes a flat coil associated with an electronic circuit intended to modulate the electromagnetic coupling with characteristic information.

3. A system according to claim 1, wherein each resonant circuit incorporated into the child seat has a resonant frequency and includes means for switching the resonant frequency of each resonant circuit, the switching of the resonant frequency thereby modulating the electromagnetic coupling.

4. A system according to claim 3, wherein each electromagnetic induction emitter circuit incorporates an oscillator operating at a given frequency and each resonant circuit in the child seat modulates the resonant frequency with a subcarrier frequency synchronous with oscillator.

5. A system according to claim 4, wherein each resonant circuit has a distinct subcarrier frequency.

6. A system according to claim 4, wherein each electromagnetic induction receiver circuit incorporates a demodulation circuit.

7. A system according to claim 6, including means for synchronizing the demodulation circuit with an excitation signal produced by the oscillator, and wherein the excitation signal produced by the oscillator is compared for coincidence with a signal received by each electromagnetic induction receiver circuit.

8. A system according to claim 3, wherein means is provided for modulating the inductive coupling of the resonant circuits using a pseudo-random binary sequence imposed on the resonant circuits.

9. A system according to claim 1, wherein each electromagnetic emitter circuit emits an excitation frequency and means is provided to periodically vary the excitation frequency within a band of predetermined frequencies.

10. A system according to claim 1 further comprising, in the child seat, an occupancy sensor for sensing whether the child seat is occupied, and wherein the information transmitted by the modulation of the electromagnetic coupling is modified by the occupancy sensor.

11. A system according to claim 1, wherein each electromagnetic induction emitter circuit includes at least one elongate inductive structure extending over a lateral side of the passenger seat, each resonant circuit includes at least two inductive coils, at least one inductive coil situated laterally on each side in the base of the child seat, and each elongate inductive structure in the passenger seat and each inductive coil in the child seat is sized such that their superficial dimensions are greater than or,comparable with the vertical distance between each elongate inductive structure in the passenger seat and each inductive coil in the child seat.

12. A system according to claim 11, wherein each lateral side of the passenger seat contains at least one inductive emitter structure.

13. A system according to claim 12, wherein each inductive emitter structure is formed on a flexible thin film incorporated into the seat.

14. A system according to claim 1, wherein each electromagnetic induction receiver circuit includes at least one elongate inductive structure extending over a lateral side of the passenger seat, each resonant circuit includes at least two inductive coils, at least one inductive coil situated laterally on each side in the base of the child seat, and each elongate inductive structure in the passenger seat and each inductive coil in the child seat is sized such that their superficial dimensions are greater than or comparable with the vertical distance between each elongate inductive structure in the passenger seat and each inductive coil in the child seat.

15. A system according to claim 14, wherein each lateral side of the passenger seat contains at least one inductive receiver structure.

16. A system according to claim 15, wherein each inductive receiver structure is formed on a flexible thin film incorporated into the seat.

* * * * *